(12) United States Patent
Nyberg (10) Patent No.: US 7,529,643 B2
(45) Date of Patent: May 5, 2009

(54) FAULT DIAGNOSIS

(75) Inventor: Mattias Nyberg, Tullinge (SE)

(73) Assignee: Scania CV AB, Soedertaelje (SE)

( * ) Notice: Subject to any disclaimer, the term of this patent is extended or adjusted under 35 U.S.C. 154(b) by 0 days.

(21) Appl. No.: 11/765,075

(22) Filed: Jun. 19, 2007

(65) Prior Publication Data

US 2008/0189076 A1    Aug. 7, 2008

(30) Foreign Application Priority Data

Jun. 22, 2006    (SE)    .................................... 0601377

(51) Int. Cl.
    *G06F 15/00* (2006.01)
(52) U.S. Cl. ........................ 702/182; 702/119; 702/123; 702/183; 701/33; 717/136; 717/142; 717/143
(58) Field of Classification Search ................ 702/119, 702/183, 123, 182; 701/33; 717/136, 142, 717/143
    See application file for complete search history.

(56) References Cited

U.S. PATENT DOCUMENTS

| 5,544,308 | A | 8/1996 | Giordano et al. |
| 5,922,079 | A | 7/1999 | Booth et al. |
| 6,983,200 | B2 | 1/2006 | Bodin et al. |
| 7,012,512 | B2 | 3/2006 | St. Denis |
| 7,085,680 | B2 * | 8/2006 | Huang ........................ 702/183 |

FOREIGN PATENT DOCUMENTS

| EP | 1356996 A2 | 10/2003 |
| EP | 1136912 B1 | 11/2004 |
| JP | 2004151021 A | 5/2004 |
| WO | WO02/054654 A2 | 7/2002 |

OTHER PUBLICATIONS

Dekleer, J. and Williams, B.C.; Diagnosing Multiple Faults; Artificial Intelligence; 1987; pp. 97-130; Issue 1, vol. 32; Elsevier Science Publishers B.V., North-Holland.

Reiter, R.; A Theory of Diagnosis from First Principles; Artificial Intelligence, Apr. 1987; pp. 57-95; Issue 1, vol. 32; Elsevier Science Publishers B.V., North-Holland.

Nyberg, Mattias and Krysander, Mattias; Combining AI, FDI, and Statistical Hypothesis-Testing in a Framework for Diagnosis; Proceedings of IFAC Safe Process '03; 2003; Washington, USA.

* cited by examiner

*Primary Examiner*—Tung S Lau
*Assistant Examiner*—Sujoy K Kundu
(74) *Attorney, Agent, or Firm*—Moore & Van Allen PLLC; W. Kevin Ransom (57) ABSTRACT

Status estimation is determined for an entity having a plurality of components. An original disjunction of diagnostic expressions indicating at least one of a fault-free or at least one fault mode for at least one of the components is determined, which is then investigated against a set of diagnostic test results, and expressions that do not imply the test result are discarded. Further, for each statement in the test result, a joint diagnostic expression is generated representing a conjunction of the statement and the currently investigated diagnostic expression. Joint diagnostic expressions that imply one of the original diagnosis expressions are discarded. Otherwise, they are added to an updated disjunction of diagnostic expressions. All remaining diagnostic expressions in the temporary disjunction of diagnostic expressions are then added to the updated disjunction of diagnostic expressions, and a status report is produced.

9 Claims, 2 Drawing Sheets

FAULT DIAGNOSIS

THE BACKGROUND OF THE INVENTION AND PRIOR ART

The present invention relates generally to diagnosing complex systems and devices including a large number of parts and components.

As today's technical systems generally become increasingly complex, efficient monitoring and detection of malfunctioning components is an area that gains progressive importance. Fault diagnosis algorithms may be applied to determine why an entity does not behave as intended. Typically, "diagnosing" the entity means selecting a subset of a predetermined set of causes responsible for the entity's incorrect behavior. A diagnosis must both explain the incorrect behavior and optimize some objective function, such as probability of correctness or cost of incorrect diagnosis. The need to diagnose is a common reason to measure or to test the entity. It is assumed that the entity consists of a finite number of diagnosed components. Further, failures of the entity are caused only by faults in one of these components.

In Reiter, R., "A theory of diagnosis from first principles", *Artificial Intelligence*, 32(1):57.95, April, 1987 and deKleer, J. and Williams, B. C., "Diagnosing multiple faults" *Artificial Intelligence*, Issue 1, Volume 32:pp. 97.130, 1987, algorithms for finding all so-called minimal diagnoses are presented. Later, various improvements of these algorithms have also been described. The above-mentioned original algorithm and its associated framework as presented by deKleer and Williams presumes that the system to be diagnosed includes a number of components being represented by a set C. Here, a conflict is represented as a set $C \subseteq C$. A conflict C is understood to mean that not all components in C can be in the fault-free mode. Moreover, a conflict $C_1$ is said to be minimal if there is no other conflict $C_2$ such that $C_2 \subset C_1$.

A diagnosis δ is also represented as a set $\delta \subseteq C$. The meaning of a diagnosis δ is that the components contained in δ are faulty and the components not contained in δ are fault-free. A diagnosis $\delta_1$ is said to be minimal if there is no other diagnosis $\delta_2$ such that $\delta_2 \subset \delta_1$.

One fundamental relation between conflicts and diagnoses is that if $\mathbb{C}$ is the set of all minimal conflicts, then δ is a diagnosis if and only if for all conflicts $C \in \mathbb{C}$ it holds that $\delta \cap C \neq \emptyset$.

Given a set of diagnoses Δ and a conflict C the minimal hitting set algorithm according to deKleer and Williams finds an updated set of minimal diagnoses. Specifically, the algorithm as described by deKleer and Williams, can be written as follows.

```
Input:    a set of minimal diagnoses Δ, and a conflict set C.
Output:   an updated set of minimal diagnoses Θ.
Δ_old = Δ
for all δ_i ∈ Δ do
    if δ_i ∩ C ≠ ∅; then
        Remove δ_i from Δ_old
        for all c ∈ C do
            δ_new := δ_i ∪ {c}
            for all δ_k ∈ Δ, δ_k ≠ δ_i do
                if δ_k ⊆ δ_new; then
                    go to LABEL1
                end if
            next
            Δ_add := Δ_add ∪ {δ_new}
            LABEL1
        next
```

-continued

```
        end if
    next
    Θ := Δ_old ∪ Δ_add
```

The algorithm has the properties that if Δ is the set of all minimal diagnoses, the algorithm output Θ will contain all minimal diagnoses with respect to also the new conflict C. Further, it holds that Θ will contain only minimal diagnoses.

These are certainly useful properties when monitoring and testing an entity. However, when determining the status of a complex entity, it is a severe limitation that each tested component may only have two possible behavioral modes, i.e. either be fault-free or be faulty. Instead, more specific fault statuses are desirable for improved diagnosis quality.

SUMMARY OF THE INVENTION

The object of the present invention is therefore to provide a solution, which solves the problem above, and thus offers distinction between more than two behavioral modes.

According to one aspect of the invention, the object is achieved by the initially described diagnosis engine, wherein the processing unit is adapted to receive an original disjunction of diagnostic expressions indicating at least one of said modes for at least one of said components, i.e. whether the component is in the fault-free mode or if it has attained exactly one of at least one fault mode. The processing unit is also adapted to receive test results of diagnostic tests in respect of the entity. In each processing cycle of the proposed processing, however, only one test result is processed. Here, each test result is a disjunction of statements, wherein each statement indicates at least one of said modes for one of said components. Further, the processing unit is adapted to copy the expressions in the original disjunction of diagnostic expressions to a temporary disjunction of diagnostic expressions in a first storage area. Preferably, the original disjunction of diagnostic expressions is empty prior to receiving a first test result in respect of the entity. Nevertheless, for each diagnostic expression in the temporary disjunction of diagnostic expressions, the processing unit is adapted to investigate whether or not a currently investigated diagnostic expression implies the test result. If this is found not to be the case, the processing unit is adapted to remove the diagnostic expression from the temporary disjunction of diagnostic expressions. Moreover, for each statement in the test result, the processing unit is adapted to generate a joint diagnostic expression representing a conjunction of the statement and the currently investigated diagnostic expression. Then, the processing unit is adapted to compare the joint diagnostic expression with each diagnostic expression in the original disjunction of diagnostic expressions except the currently investigated diagnostic expression. If an original diagnostic expression is found, where the joint diagnostic expression implies the original diagnosis expression, the processing unit is adapted to discard the joint diagnostic expression. Otherwise, the processing unit adds the joint diagnostic expression to an updated disjunction of diagnostic expressions in a second storage area. Here, the updated disjunction of diagnostic expressions represents an estimated status of the entity. After having processed the test result and all received diagnostic expressions, the processing unit is adapted to also add any remaining diagnostic expressions in the temporary disjunction of diagnostic expressions to the updated disjunction of diagnostic expressions. Finally, the processing unit is adapted to produce a status report based on the updated disjunction of diagnostic expressions.

Important advantages by this diagnosis engine is that it allows multiple behavioral modes essentially without increasing the algorithm complexity relative to the original algorithm of deKleer and Williams.

According to one embodiment of this aspect of the invention, after having processed a result of a first test of the tests, the processing unit is adapted to, for each result of at least one second test of the tests, investigate, for each diagnostic expression in the temporary disjunction of diagnostic expressions, whether or not a currently investigated diagnostic expression implies the second test result. If this is found not to be the case, the expression is removed from the temporary disjunction of diagnostic expressions. When in a first step, only one test result is considered, the diagnoses are already described by this result. Thus, the algorithm is not needed. Analogous to the above, the processing unit is adapted to, for each statement in the second test result, generate a joint diagnostic expression representing a conjunction of the statement and the currently investigated diagnostic expression. The processing unit is adapted to compare the joint diagnostic expression with each diagnostic expression in the original disjunction of diagnostic expressions except for the currently investigated diagnostic expression, and if an original diagnostic expression is found, where the joint diagnostic expression implies the original diagnosis expression, the processing unit is adapted to discard the joint diagnostic expression. Otherwise, the joint diagnostic expression is added to an updated disjunction of diagnostic expressions in the second storage area. After having processed the test result and all received diagnostic expressions, the processing unit is adapted to add all remaining diagnostic expressions in the temporary disjunction of diagnostic expressions to the updated disjunction of diagnostic expressions. Subsequently, the processing unit is adapted to produce an updated status report based on the up-dated disjunction of diagnostic expressions. A gradually improved status report can then be generated as further test results are received.

According to another aspect of the invention, the object is achieved by the motor vehicle described initially, wherein the diagnosis system includes the above-proposed diagnosis engine.

According to another aspect of the invention, the object is achieved by the method described initially, wherein an original disjunction of diagnostic expressions is received and copied into a temporary disjunction of diagnostic expressions in a first storage area. The original disjunction of diagnostic expressions indicates at least one of said modes for at least one of said components. A test result is also received, where the result reflects tests performed in respect of the entity. Here, each test result is a disjunction of statements, wherein each statement indicates at least one of said modes for one of said components. For each diagnostic expression in the temporary disjunction of diagnostic expressions, it is investigated whether or not a currently investigated diagnostic expression implies the test result. If not so, the expression is removed from the temporary disjunction of diagnostic expressions. For each statement in the test result, the method involves, generating a joint diagnostic expression that represents a conjunction of the statement and the currently investigated diagnostic expression. The joint diagnostic expression is compared with each diagnostic expression in the original disjunction of diagnostic expressions except for the currently investigated diagnostic expression. If an original diagnostic expression is found, where the joint diagnostic expression implies the original diagnosis expression, the method involves discarding the joint diagnostic expression. Otherwise, the joint diagnostic expression is added to an updated disjunction of diagnostic expressions in a second storage area. After having processed the test result and all received diagnostic expressions, all remaining diagnostic expressions in the temporary disjunction of diagnostic expressions are added to the updated disjunction of diagnostic expressions. Finally, a status report is produced based on the updated disjunction of diagnostic expressions.

The advantages of this method, as well as the preferred embodiments thereof, are apparent from the discussion hereinabove with reference to the proposed diagnosis engine.

According to a further aspect of the invention the object is achieved by a computer program product directly loadable into the internal memory of a computer, comprising software for controlling the above proposed method when said program is run on a computer.

According to another aspect of the invention the object is achieved by a computer readable medium, having a program recorded thereon, where the program is to make a computer control the above proposed method.

BRIEF DESCRIPTION OF THE DRAWINGS

The present invention is now to be explained more closely by means of embodiments, which are disclosed as examples, and with reference to the attached drawings.

DESCRIPTION OF EMBODIMENTS OF THE INVENTION

We will describe a diagnosis algorithm that unlike the deKleer/Williams algorithm can handle also the case of more than two behavioral modes per component. In the original algorithm, conflicts and diagnoses were represented as sets. For a more efficient representation in the case of more than two behavioral modes, we will here use a framework where conflicts and diagnoses are represented by logical formulas.

When describing the invention, we define the term "diagnostic expression" to designate a conjunction of statements relating to a diagnosed entity, which reflect faulty or fault-free statuses of one or more components. Thus, the diagnostic expression is a conjunction of statements. One example of a diagnostic expression is:

"the intake pressure sensor is fault-free or has a bias, and the exhaust gas regulator valve has jammed in a closed position or has an unknown error."

A "test result" is understood to mean a set of statements, wherein at least one statement is true. Thus a test result is a disjunction of statements. One example of a test result is:

"the intake pressure sensor is fault-free or has a bias, or the exhaust gas regulator valve has jammed in a closed position or has an unknown error."

Of course, given these definitions, a diagnostic expression is generally more informative (or contains information of a higher quality) than a test result.

Moreover, a first diagnostic expression may logically "imply" a second diagnostic expression. One example of such an implication is:

"the intake pressure sensor is fault-free" implies that
"the intake pressure sensor is fault-free or has a bias."

Another example is:

"the intake pressure sensor is fault-free or has a bias, and the exhaust gas regulator valve has jammed in a closed position" implies that
"the intake pressure sensor is fault-free or has a bias."

Formally, each component is assumed to be in exactly one out of several behavioral modes. A behavioral mode can be for example no-fault, abbreviated NF, gain-fault G, bias B, open circuit OC, short circuit SC, unknown fault UF, or just faulty F. For our purposes, each component is abstracted to a variable specifying the mode of that component. Let now C denote the set of such variables. For each component variable c let $R_c$ denote the domain of possible behavioral modes, i.e. $c \in R_c$.

To reason about the behavioral modes of different components, we use the following formal language. The expression $c \in M$, where $c \in C$ and $M \subseteq R_c$ is a formula. For example, if p is a pressure sensor, the formula $p \in \{NF, G, UF\}$ means that the pressure sensor p is in mode NF, G or UF. If M is a singleton, e.g. M={NF}, this may also be expressed c=NF. Further, the constant $\perp$ with value false, is a formula. If $\phi$ and $\gamma$ are formulas, then $\phi \wedge \gamma$, $\phi \vee \gamma$, and $\neg \phi$ are also formulas. In accordance with the theory of first order logic, we say that a formula $\phi$ is implied by another formula $\gamma$, and write $\gamma|=\phi$, if all assignments of the variables C that make $\gamma$ true also make $\phi$ true. This can be generalized to sets of formulas, i.e. $\{\gamma_1, \ldots, \gamma_n\}|=\{\phi_1, \ldots, \phi_m\}$ if and only if $\gamma_1 \wedge \ldots \wedge \gamma_n |= 1\phi_1 \wedge \ldots \wedge \phi_m$. If it holds that $\Gamma|=\Phi$ and $\Phi|=\Gamma$, where $\Phi$ and $\Gamma$ are formulas or sets of formulas, $\Phi$ and $\Gamma$ are said to be equivalent and we write $\Gamma \equiv \Phi$.

For conjunctions $(c_{i1} \in M_{i1} \wedge \in M_{i2} \wedge \ldots c_{ini} \in M_{ini})$, we will often use the notation $D_i$. We will say that a formula is in maximal normal form (MNF) if it is written on the form $$(c_{11} \in M_{11} \wedge c_{12} \in M_{12} \wedge \ldots c_{1n1} \in M_{1n1}) \vee \ldots$$
$$\vee (c_{m1} \in M_{m1} \wedge \ldots \wedge c_{mnm} \in M_{mnm}) \text{ where } c_{ij} \neq c_{ik} \text{ if } j \neq k, \text{ and}$$

1) no conjunction is implied by another conjunction, i.e. for each conjunction $D_i$, there is no conjunction $D_j$, $j \neq i$, for which it holds that $D_j|=D_i$, and
2) each $M_{ij}$ is a nonempty proper subset of $R_{cij}$, i.e.; $\emptyset \neq M_{ij} \subset R_c$.

Note that the purpose of using formulas in MNF is that the two MNF-requirements guarantee that a formula is relatively compact in the sense that it does not contain redundant conjunctions and that each conjunction does not contain redundant assignments.

For example consider the following two formulas containing pressure sensors $p_1$, $p_2$ and $p_3$, where all have the behavioral modes $R_{pi}=\{NF, G, B, UF\}$.

$$p_1 \in \{UF\} \wedge p_2 \in \{B, UF\} \vee p_3 \in \{UF\}$$

$$p_1 \in \{UF\} \wedge p_2 \in \{B, UF\} \vee p_1 \in \{G, UF\}$$

The first formula is in MNF, however not the second formula, since $p_1 \in \{(UF)\} \wedge p_2 \in \{B, UF\}/= p_1 \in \{G, UF\}$.

Using the logical language defined above, a conflict can be expressed as follows. For example, if it has been found that the pressure sensor $p_1$ cannot be in the mode NF at the same time as $p_2$ is in the mode B or NF, this gives the conflict $$H = p_1 \in \{NF\} \wedge p_2 \in \{B, NF\} \tag{1}$$

This definition of conflict can be compared with the previously mentioned conflict C={a, b, c}. Using the logical language, we can write this conflict as $a \in \{NF\} \wedge b \in \{NF\} \wedge c \in \{NF\}$ Instead of conflicts, the invention will primarily be described with reference to negated conflicts. Therefore, as an alternative to H, we consider $\neg H$. In particular we will use negated conflicts written in MNF. For an example, the negated conflict $\neg H$, where H is defined in (1), can be written in MNF as:

$$p_1 \in \{G, B, UF\} \vee p_2 \in \{G, UF\}$$

In this context, the negated conflict is equivalent to the above-mentioned test result. Without loss of generality, we will from now on assume that all negated conflicts are written on the form:

$$c_1 \in M_1 \vee c_2 \in M_2 \vee \ldots \vee c_n \in M_n \tag{2}$$

where $c_j \neq c_k$ if $j \neq k$ and $\emptyset \neq M_i \subset R_{ci}$. This means that (2) is in MNF.

A system behavioral mode is defined as a conjunction containing a unique assignment of all components in C. For example if C={$p_1$, $p_2$, $p_3$}, a system behavioral mode could be:

$$p_1 = UF \wedge p_2 = B \wedge p_3 = NF$$

We consider the term diagnosis to refer to a system behavioral mode consistent with all negated conflicts. More formally, if $\mathbb{P}$ is the set of all negated conflicts, a system behavioral mode d is a diagnosis if $\{d\} \cup \mathbb{P} |\neq \perp$ or equivalently $d|=\mathbb{P}$.

To relate this definition of diagnosis to the definition used by deKleer and Williams, assume that C={a, b, c, d} and consider the diagnosis $\delta$={a, b}. With the logical language, we can write this diagnosis as $a=F \wedge b=F \wedge c=NF \wedge d=NF$.

The algorithm according to the present invention is capable of handling more than two behavioral modes per component. As inputs, the algorithm takes a formula D and a negated conflict P, which are both written in MNF. The purpose of the algorithm is then to derive a new formula Q in MNF such that $Q \equiv D \wedge P$.

In the algorithm, we use the notation $D_i \in D$ to denote the fact $D_i$ is a conjunction in D. Hence, the algorithm can be expressed as follows:

---

Input: a formula D in MNF, and a negated conflict P in MNF
Output: Q
$D_{old} = D$
for all $D_i \in D$ do
    if $D_i |\neq P$ then
        Remove $D_i$ from $D_{old}$
        for all $P_j \in P$ do
            Let $D_{new}$ be a conjunction in MNF such
                that $D_{new} \equiv D_i \wedge P_j$
            for all $D_k \in D$, $D_k \neq D_i$ do
                if $D_{new} |= D_k$ then
                      go to LABEL1
                end if
            next
            $D_{add} := D_{add} \vee D_{new}$
            LABEL1
        next
    end if
next
$Q := D_{old} \vee D_{add}$

---

According to one embodiment of the invention, the algorithm is implemented as follows. To illustrate how the condition $D_i|=P$ may be checked, we will consider an example where $D_i$ contains components $c_1$, $c_2$ and $c_3$ and P contains components $c_2$, $c_3$ and $c_4$. Since D is in MNF and P is in the form (2), $D_i$ and P will have the form $$D_i: c_1 \epsilon M_1^D {}^{\wedge} c_2 \epsilon M_2^D {}^{\wedge} c_3 \epsilon M_3^D \quad (3)$$

$$P = c_2 \epsilon M_2^P v c_3 \epsilon M_3^P v c_4 \epsilon M_4^P \quad (4)$$

We realize that the condition $D_i|=P$ holds if and only if $M_2^D \subseteq M_2^P$ or $M_3^D \subseteq M_3^P$. Thus, this example shows that in general, $D_i|=P$ holds if and only if $D_i$ and P contain at least one common component $c_i$ where $M_i^D \subseteq M_i^P$.

An expression $Q_{new}$ in MNF must be found such that $D_{new} \cong D_i {}^{\wedge} P_j$. To illustrate this, consider an example where $D_i$ contains components $c_1$ and $c_2$, and $P_j$ contains the component $c_2$. Since D is in MNF and P is in the form (2), $D_i$ and $P_j$ will have the form $$D_i = c_1 \epsilon M_1^D {}^{\wedge} c_2 \epsilon M_2^D \quad (5a)$$

$$P_j = c_2 \epsilon M_2^P \quad (5b)$$

Then $Q_{new}$ will be formed as $$D_{new} = c_1 \epsilon M_1^D {}^{\wedge} c_2 \epsilon M_2^D \cap M_2^P$$

which means that $D_{new} \cong D_i {}^{\wedge} P_j$. If it holds that $M_2^P \neq \emptyset$, $D_{new}$ will be in MNF. Otherwise let $D_{new} = \bot$.

The condition $D_{new}|=D_k$ must be checked. To illustrate this, consider an example where $D_{new}$ contains components $c_1$ and $c_2$ and $D_k$ contains the components $c_2$ and $c_3$. Since $D_{new}$ and D are both in MNF, $D_{new}$ and $D_k$ will have the form $$D_{new} = c_1 \epsilon (M_1^{n} {}^{\wedge} c_2 \epsilon M_2^{n} \quad (6a)$$

$$D_k = c_2 \epsilon M_2^D {}^{\wedge} c_3 \epsilon M_3^D \quad (6b)$$

Without changing their meanings, these expressions can be expanded so that they contain the same set of components:

$$D'_{new} = c_1 \epsilon M_1^{n} {}^{\wedge} c_2 \epsilon M_2^{n} {}^{\wedge} c_3 \epsilon R_{c3} \quad (7)$$

$$D'_k = c_1 \epsilon R_{c1} {}^{\wedge} c_2 \epsilon M_2^D {}^{\wedge} c_3 \epsilon M_3^D \quad (8)$$

Now we see that the condition $D_{new}|=D_k$ holds if and only if $M_1^n \subseteq R_{c1}$, $M_2^n \subseteq M_2^D$ and $R_{c3} \subseteq M_3^D$. The first of these three conditions is always fulfilled and the third can never be fulfilled since, by definition of MNF, $M_3^D \subseteq R_{c3}$. Thus, this example shows that $D_{new}|=D_k$ holds if and only if (1) $D_k$ contains only components that are also contained in $D_{new}$, and (2) for all components $c_i$ contained in both $D_{new}$ and $D_k$ it holds that $M_i^n \subseteq M_i^D$.

The expression $D_{add} := D_{add} v D_{new}$ must be considered. Since $D_{add}$ is not assigned from the beginning, this expression is to be read as $D_{add} := D_{new}$ when $D_{add}$ is unassigned.

We must also consider the expression $Q := D_{old} v D_{add}$. Note that after several removals, $D_{old}$ may become empty. It may therefore happen that either $D_{old}$ or $D_{add}$ is unassigned. Therefore the expression $Q := D_{old} v D_{add}$ should be read as $Q := D_{old}$ if $D_{add}$ is unassigned, and $Q := D_{add}$ if $D_{old}$ is unassigned. A safe way to avoid this is to always include a UF mode in all sets $M_i$ in (2).

Preferably, the algorithm is used in an iterative manner as follows. First, when only one negated conflict $P_1$ is considered, the diagnoses are already described by $P_1$. Thus, the algorithm is not needed. When a second negated conflict $P_2$ is considered, the algorithm is fed with $D=P_1$ and $P=P_2$, and produces the output Q such that $Q \cong P_1 {}^{\wedge} P_2$. Then, for each additional negated conflict $P_n$ that is considered, the input D is the old output Q.

When the algorithm is used in this way, the following results can be guaranteed.

Theorem 1 Let $\mathbb{P}$ be a set of negated conflicts and let Q be the output from the proposed algorithm after processing all negated conflicts in $\mathbb{P}$. Then it holds that $Q \cong \mathbb{P}$.

PROOF. Let P be the negated conflict in a last application of the algorithm, and let $\mathbb{P}_{n-1}$ denote the set of all negated conflicts in $\mathbb{P}$ except P. Then it holds that $\mathbb{P} \cong \mathbb{P}_{n-1} \cup \{P\} \cong D {}^{\wedge} P$. Lemma 4 below implies that $D {}^{\wedge} P = Q$. Left to prove is $Q| = D {}^{\wedge} P$. Take an arbitrary conjunction $Q_k$ in the output Q. If $Q_k$ is in $D_{old}$, then it must be in also D, i.e. $Q_k = D_i$ for some conjunction $D_i$ in D. The fact that $D_i$ is in $D_{old}$ means also that $D_i|=P$. Thus $Q_k = D_i|=D {}^{\wedge} P$. If $Q_k$ instead is in $D_{add}$, there is a $D_i$ in D and a $P_j$ in P such that $Q_k \cong D_i {}^{\wedge} P_j$ which implies $Q_k|=D {}^{\wedge} P$.

Lemma 1 The output Q from the proposed algorithm fulfills MNF requirement 1.

PROOF. Assume the contrary, that $Q_1$ and $Q_2$ are two conjunctions in Q and $Q_2|=Q_1$. There are three cases that need to be investigated: (1) $Q_1 \epsilon D_{old}$, $Q_2 \epsilon D_{add}$, (2) $Q_2 \epsilon D_{old}$, $Q_1 \epsilon D_{add}$, (3) $Q_1 \epsilon D_{add}$, $Q_2 \epsilon D_{add}$.

1) The fact $Q_2 \epsilon D_{add}$ means that $D_{new} = Q_2$ at some point. Since $Q_1 \epsilon D_{old}$, $D_{new}$ must then have been compared to $Q_1$. Since $Q_2$ has really been added, it cannot have been the case that $Q_2|=Q_1$.

2) Since $Q_1 \epsilon D_{add}$, it holds that $Q_1 = D_i {}^{\wedge} P_j$ for some $Q_i \epsilon D$. The fact $Q_2|=Q_1$ implies that $Q_2|=D_i {}^{\wedge} P_j|=D_i$. This is a contradiction since $Q_2 \epsilon D$, and D fulfills the MNF-requirement 1.

3) There are three cases: (a) $Q_2 = D_i {}^{\wedge} P_{j2}|=D_i {}^{\wedge} P_{j1} = Q_1$, (b) $Q_2 = D_{i2} {}^{\wedge} P_j|=D_i {}^{\wedge} P_j = Q_1$, (c) $Q_2 = D_{i2} {}^{\wedge} P_{j2}|=D_{i1} {}^{\wedge} P_{j1} = Q_1$, where in all cases, $P_{j1} \neq P_{j2}$ and $D_{i1} \neq D_{i2}$.

a) We know that $D_i$ and P are formulas on forms like $D_i = a \epsilon A {}^{\wedge} b \epsilon B {}^{\wedge} c \epsilon C$ and $P = a \epsilon A_p v b \epsilon B_p$ respectively. This means that $Q_1 = a \epsilon A \cap A_p {}^{\wedge} b \epsilon B {}^{\wedge} c \epsilon C$ and $Q_1 = a \epsilon A {}^{\wedge} b \epsilon B \cap B_p {}^{\wedge} c \epsilon C$. The fact $Q_2|=Q_1$ implies that $A \subseteq A \cap A_p$, which further means that $A \subseteq A_p$. This implies $Di = a \epsilon A {}^{\wedge} b \epsilon B {}^{\wedge} c \epsilon C|=a \epsilon A_p|=P$. Thus, $Q_1$ and $Q_2$ are never subject to be added to $D_{add}$.

b) We have that $Q_2 = D_{i2} {}^{\wedge} P_j|=D_{i1} {}^{\wedge} P_j|=D_{i1} \epsilon D$. This means that $Q_2 = D_{i2} {}^{\wedge} P_j$ cannot have been added to $D_{add}$.

c) We have that $Q_2 = D_{i2} {}^{\wedge} P_{j2}|=D_{i1} {}^{\wedge} P_{j1}|=D_{i1} \epsilon D$. This means that $Q_2 = D_{i2} {}^{\wedge} P_{j2}$ cannot have been added to $D_{add}$.

All these investigations show that it impossible that $Q_2|=Q_1$.

Lemma 2 Let Q be the output from the proposed algorithm after processing all negated conflicts in $\mathbb{P}$. For any two conjunctions $Q_1$ and $Q_2$ in Q, there is no component c and conjunction $\overline{D}$, not containing c, such that $Q_1 \cong \overline{D} {}^{\wedge} c \epsilon M_1$ and $Q_2 \cong \overline{D} {}^{\wedge} c \epsilon M_2$.

PROOF. Assume that there is a component c and conjunction $\overline{D}$ such that $Q_1 \cong \overline{D} {}^{\wedge} c \epsilon M_1$ and $Q_2 \cong \overline{D} {}^{\wedge} c \epsilon M_2$. We can write $Q_1$ as $c \epsilon \Omega^{\phi_c^1} {}^{\wedge} \overline{D}_1$ where $\Omega^{\phi_c^1}$ is the intersection of the sets $M_c^P$ obtained from all $P \epsilon \phi_c^1 \subseteq \mathbb{P}$, and $\overline{D}$ is the conjunction of one $P_j$ obtained from every $P \epsilon \mathbb{P} \setminus \phi_c^1$. Similarly we write $Q_2$ as $c \epsilon \Omega^{\phi_c^2} {}^{\wedge} \overline{D}_2$.

We can find a D' such that $D' \cong \overline{D}_1 \cong \overline{D}_2$ and where D' is the conjunction of one $P_j$ obtained from every $P \epsilon \mathbb{P} \setminus (\phi_c^1 \cap \phi_c^2)$. Then let $D^* = c \epsilon \Omega^{\phi_c^1 \cap \phi_c^2} {}^{\wedge} D'$ which means that $Q_1| = c \epsilon \Omega^{\phi_c^1 \cap \phi_c^2} {}^{\wedge} \overline{D}_1 \cong D^*$. Similarly we can obtain the relation $Q_2|=c \epsilon \Omega^{\phi_c^1 \cap \phi_c^2} {}^{\wedge} \overline{D}_2 \cong D^*$. By construction of $D^*$ it can be realized that $D^*|=Q_k$ for some conjunction $Q_k$ in Q. Thus $Q_1|=Q_k$ and according to Theorem 2, the only possibility is that $Q_k = Q_1$, which is a contradiction. This means that there can not be a component c and conjunction $\overline{D}$ such that $Q_1 \cong \overline{D} {}^{\wedge} c \epsilon M_1$ and $Q_2 \cong \overline{D} {}^{\wedge} c \epsilon M_2$.

Lemma 3 Let $Q = D_{old} {}^{\wedge} D_{add}$ be the output from the proposed algorithm after processing all negated conflicts in $\mathbb{P}$. If $D_{im}$ is not contained in $D_{old}$, and the set $D_{im} {}^{\wedge} P_j$ is not contained in $D_{add}$, after running the algorithm, then there is a $D_{im+1}$ in D such that $D_{im} {}^{\wedge} P_j|=D_{im+1}$ and $D_{im+1} {}^{\wedge} P_j \neq D_{im} {}^{\wedge} P_j$.

PROOF. The fact that $D_{im}$ is not contained in $D_{old}$ means that the inner loop of the algorithm must have been entered when $D_i=D_{im}$. Then the fact that $D_{im}\hat{}P_j$ is not contained in $D_{add}$, means that $D_{im}\hat{}P_j|=D_k$ for some $D_k$, $k\neq i_m$. By choosing $i_{m+1}=k$, this gives $D_{im}\hat{}P_j|=D_{im+1}$.

Next we prove that $D_k\hat{}P_j|\neq D_i\hat{}P_j$. Let the single assignment in $P_j$ be $a\epsilon A_p$, and let comps $D_i$ denote the set of comps in $D_i$. We will divide the proof into four cases: (1) $a\not\in$comps $D_i$, $a\not\in$comps $D_k$, (2) $a\epsilon$comps $D_i$, $a\not\in$comps $D_k$, (3) $a\epsilon$comps $D_i$, $a\epsilon$comps $D_k$, and (4) $a\epsilon$comps $D_i$, $a\epsilon$comps $D_k$.

1) The fact $D_i\hat{}P_j|=D_k$ would imply $D_i|=D_k$ which is impossible because D is in MNF.

2) This case means that $D_i$ can be written as $D_i=D'\hat{}a\epsilon A_i$. The fact $D_i\hat{}P_j=D'\hat{}a\epsilon A_i \cap A_p|=D_k$, together with the fact that $a\not\in$comps $D_k$, would then imply that $D'|=D_k$ and consequently that $D_i|=D_k$, which is impossible because D is in MNF.

3) Assume that $D_k\hat{}P_j|=D_i\hat{}P_j$. This relation can be written $D'_k\hat{}a\epsilon A_k \cap A_k|=D_i\hat{}a\epsilon A_p$ where $D'_k$ is a conjunction not containing component a. For this relation to hold it must hold that $D'_k|=D_i$. This means that $D_k=a\epsilon A_k\hat{}D'_k|=D_i$ which is impossible because D is in MNF.

4) Assume that $D_k\hat{}P_j|=D_i\hat{}P_j$. This relation can be written $D'_k\hat{}a\epsilon A_p \cap A_k|=D'_i\hat{}a\epsilon A_p \cap A_i$ where $D'_k$ and $D'_i$ are conjunctions not containing component a. This relation would imply $D'_k|32\ D'_i$. Further on, the fact $D_i\hat{}P_j|=D_k$ can be written $a\epsilon A_p \cap A_i\hat{}D'_i|=a\epsilon A_k\hat{}D'_k$, which implies that $D'_i|=D'_k$. Thus we have $D'_i\cong D'_k$ and the only possible difference between $D_i$ and $D_k$ is the assignment of component a. Lemma 2 says this is impossible.

With $i=i_m$ and $k=i_{m+1}$, these four cases have shown that $D_{im+1}\hat{}P_j|\neq D_{im}\hat{}P_j$.

Lemma 4 Let D be the output from the proposed algorithm after processing all negated conflicts in $\mathbb{P}_{n-1}$, and Q the output given D and P as inputs. For each conjunction $D_i$ in D and $P_j$ in P it holds that there is a conjunction $Q_k$ in Q such that $D_i\hat{}P_j$.

PROOF. If, after running the algorithm, $D_i$ is contained in $D_{old}$, then the lemma is trivially fulfilled. If instead $D_i\hat{}P_i$ is contained in $D_{add}$, then the lemma is also trivially fulfilled. Study now the case where $D_i$ is not contained in $D_{old}$ and $D_i\hat{}P_j$ is not contained in $D_{add}$. We can then apply Lemma 3 with $\mathbb{P}=\mathbb{P}_{n-1}\cap\{P\}$ and $i_m=i$. This gives us a $D_{im+1}$ such that $D_{im}\hat{}P_j|=D_{im}$ and $D_{im+1}\hat{}P_j|\neq D_{im}\hat{}P_j$.

If $D_{im+1}$ is contained in $D_{old}$, then the lemma is fulfilled. If instead $D_{im+i}\hat{}P_j$ is contained in $D_{add}$, note that $D_{im}\hat{}P_j|=D_{im+1}$ implies $D_{im}\hat{}P_j|=D_{im+1}\hat{}P_j$. This means that the lemma is fulfilled. In this way we can repeatedly apply Lemma 3 as long as the new $D_{im+1}$ obtained is not contained in $D_{old}$ and $D_{im+i}\hat{}P_j$ is not contained in $D_{add}$.

We will now prove that after a finite number of applications of Lemma 3 we obtain a $D_{im+1}$ where $D_{im+1}$ is contained in $D_{old}$ or $D_{im+1}\hat{}P_j$ is contained in $D_{add}$. Note that that each application of Lemma 3 guarantees that $D_{im}\hat{}P_j|=D_{im+1}\hat{}P_j$ and $D_{im+1}\hat{}P_j\not\approx D_{im}\hat{}P_j$. This fact itself implies that there cannot be an infinite number of applications of Lemma 3.

Theorem 2 The output Q from the proposed algorithm is in MNF.

PROOF. From Lemma 1 it follows that Q contains no two conjunctions such that $Q_2|=Q_1$. All conjunctions in $D_{old}$ are trivially on the form specified by (1). All conjunctions in $D_{add}$ are also on the form (1) because of the requirement on $D_{new}$. Thus Q is in MNF.

To illustrate the algorithm according to the invention, consider the following small example where $C=\{p_1, p_2, p_3\}$ and the domain of behavioral modes for each component is $R_{pi}=\{NF, G, B, UF\}$.

$$D=D_1 v D_2 = p_1\epsilon\{G, B, UF\} v p_3\epsilon\{G, UF\}$$

$$P=P_1 v P_2 = p_2\epsilon\{B, UF\} v p_3\epsilon\{G, B, UF\}$$

First the condition $D_1|\neq P$ is fulfilled, which means that $D_1$ is removed from $D_{old}$ and the inner loop of the algorithm is entered. There a $D_{new}$ is created such that $D_{new} \cong D_1\hat{}P_2 = p_1\epsilon\{G, B, UF\}\hat{}p_2\epsilon\{B, UF\}$. This $D_{new}$ is then compared to $D_2$ in the checking the condition $D_{new}|=D_2$. The condition is not fulfilled, which means that $D_{new}$ is added to $D_{add}$. Next a $D_{new}$ is created such that $D_{new}\cong D_1\hat{}P_2=p_1\epsilon\{G, B, UF\}\hat{}p_3\epsilon\{G, B, UF\}$. Also this time, the condition $D_{new}|=D_2$ is not fulfilled, implying that $D_{new}$ is added to $D_{add}$. Next, the conjunction $D_2$ is investigated. However, since $D_2|=P$ holds, $D_2$ is not removed from $D_{old}$, and the inner loop is not entered. The algorithm output is finally formed as $$Q:=D_{old} v D_{add} = D_2 v(D_1\hat{}P_1 v D_1\hat{}P_2)=p_3\epsilon E\ \{G, UF\} v p_1\epsilon\{G, B, UF\}\hat{}p_2\epsilon\{B, UF\} v p_1\epsilon\{G, B, UF\}\hat{}p_3\epsilon\{G, B, UF\}$$

It can be verified that $Q\cong D\hat{}P$. Also, it can be seen that Q is in MNF.

Figure 1:
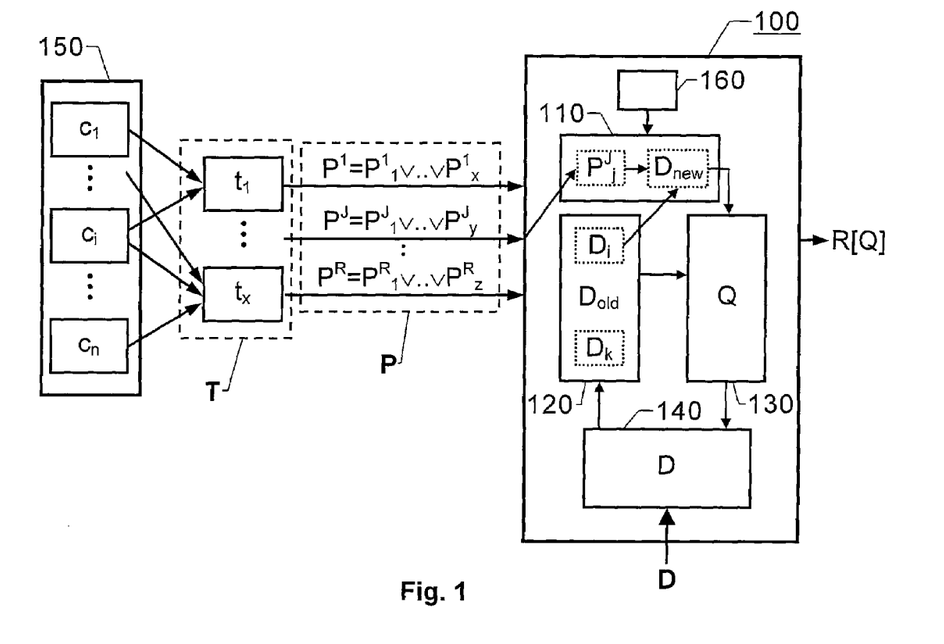
FIG. 1 shows a block diagram over the diagnosis engine according to one embodiment of the invention, FIG. 2 schematically depicts a motor vehicle equipped with the proposed diagnosis engine.

We now describe the algorithm with reference to FIG. 1, which shows a block diagram over diagnosis engine 100 for estimating a status of an entity 150 according to one embodiment of the invention. The entity 150, typically represented by a relatively complex system, has a plurality of components $c_1, \ldots, c_i, \ldots, c_n$. Each of these components is assumed to either be in a fault-free mode, or be in exactly one of at least one fault mode.

The proposed diagnosis engine 100 includes a processing unit 110 that is adapted to analyze test results $P^1, \ldots P^J, \ldots, P^R$ produced by a set of diagnostic tests $t_1, \ldots, t_x$ in respect of the entity 150. Each test result, in turn, is a disjunction of statements $P^1_1 v \ldots v P^1_x; \ldots; P^J_1 v \ldots v P^J_y; \ldots; P^R_1 v \ldots v P^R_z$, wherein each statement $P^J_j$ indicates at least one of said modes for one of said components $c_1, \ldots, c_n$.

The diagnosis engine 100 also includes at least one storage area adapted to store diagnostic data in respect of the entity 150. FIG. 1 illustrates three separate storage areas 120, 130 and 140. Naturally, in practice, these areas may be represented by different partitions of the same memory module.

The processing unit 110 is adapted to receive an original disjunction of diagnostic expressions D, which indicating at least one of said modes for at least one of said components $c_1, \ldots, c_n$. I.e. original disjunction of diagnostic expressions D expresses whether one or more of the components $c_1, \ldots, c_n$ is fault-free or faulty, and if so, which respective fault mode it has. Additionally, the processing unit 110 is adapted to receive a test result P of a set of diagnostic tests $t_1, \ldots, t_x$ in respect of the entity 150. These tests are here collectively denoted T.

The processing unit 110 is further adapted to copy the expressions in the original disjunction of diagnostic expressions D to a temporary disjunction of diagnostic expressions $D_{old}$ in a first storage area 120.

For each diagnostic expression in the temporary disjunction of diagnostic expressions $D_{old}$, the processing unit 110 is adapted to investigate whether or not a currently investigated diagnostic expression $D_i$ implies the test result $P^J$. If this is found not to be the case, the processing unit 110 is adapted to remove the expression $D_i$ from the temporary disjunction of diagnostic expressions $D_{old}$. For each statement $P^J_j$ in the test result, the processing unit 110 is adapted to generate a joint diagnostic expression $D_{new}$ representing a conjunction of the statement $P^J_j$ and the currently investigated diagnostic expression $D_i$. Then, the joint diagnostic expression $D_{new}$ is compared the with each diagnostic expression in the original disjunction of diagnostic expressions D except for the currently investigated diagnostic expression $D_i$.

If an original diagnostic expression $D_k$ is found, where the joint diagnostic expression $D_{new}$ implies the original diagnosis expression $D_k$, the processing unit 110 is adapted to discard the joint diagnostic expression $D_{new}$. Otherwise, the processing unit 110 is adapted to add the joint diagnostic expression $D_{new}$ to an updated disjunction of diagnostic expressions Q in a second storage area 130.

Subsequently (i.e. after having investigated all diagnostic expression D. in $D_{old}$), the processing unit 110 is adapted to add all remaining diagnostic expressions in the temporary disjunction of diagnostic expressions $D_{old}$ to the updated disjunction of diagnostic expressions Q. The updated disjunction of diagnostic expressions Q represents an estimated status of the entity 150, i.e. typically an enhanced version of a status represented by the original disjunction of diagnostic expressions D.

Based on the updated disjunction of diagnostic expressions Q, the processing unit 110 is adapted to produce a status report R[Q], which can be studied by a service technician, an operator of the entity 150, or other personnel being involved in the operation and/or maintenance of the entity 150.

For example, the status report R[Q] may be generated as follows. Suppose that there is a probability associated with each mode of each component, say P(pressure_sensor=NF)=0,999, P(pressure_sensor=B)=0,0006, (pressure_sensor=UF)=0,0004. Let us further assume that the components may malfunction independently of one another. Then, the probability for one mode becomes equal to the product of the individual modes. For instance, for a system having two pressure sensors, we would have P(pressure_sensor_1=NF & pressure_sensor_1=B)=0,999× 0,0006. The final diagnostic expression Q (e.g. Q=Q1 vQ2vQ3) obtained after having processed all test results is studied. Here, the most probable diagnoses are stored, which match Q1. Then, if there is another diagnosis matching Q2, which is even more probable, this diagnosis may be stored instead of Q1, and so on. In a system having three pressure sensors we may have the final diagnostic expression Q=Q1vQ2=P1⊆{NF, B} & P2⊆{UF}vP2⊆{UF} & P3⊆{B, UF}. The most probable diagnosis matching Q1 is <NF, UF, NF>, whereas the most probable diagnosis matching Q2 is <NF, NF, B>, which is somewhat more probable than <NF, UF, NF>. Therefore, <NF, NF, B> is stored and <NF, UF, NF> is discarded. Consequently, the status report may be R[Q]={<NF, NF, B>}.

According to one preferred embodiment of the invention, the processing unit 110 is adapted to gradually modify the updated disjunction of diagnostic expressions Q (and preferably also produce an improved status report R[Q]) in response to subsequent test results. To this aim, after having processed a result of a first test $t_1$ in the test result P, the processing unit 110 is adapted to, for each result of at least one second test $t_x$ in the test result P, investigate, for each diagnostic expression in the temporary disjunction of diagnostic expressions $D_{old}$, whether or not a currently investigated diagnostic expression $D_i$ implies the result of the second test $t_x$. Analogous to the above, the processing unit 110 is adapted to remove the expression $D_i$ from the temporary disjunction of diagnostic expressions $D_{old}$ if the currently investigated diagnostic expression $D_i$ does not imply the result of the second test $t_x$.

However, for each statement $P^J_j$ in the result of the second test $t_x$ that fulfills this requirement, the processing unit 110 is adapted to generate a joint diagnostic expression $D_{new}$ representing a conjunction of the statement $P^J_j$ and the currently investigated diagnostic expression $D_i$. The joint diagnostic expression $D_{new}$ is compared with each diagnostic expression in the original disjunction of diagnostic expressions D except for the currently investigated diagnostic expression $D_i$, and if an original diagnostic expression $D_k$ is found, where the joint diagnostic expression $D_{new}$ implies the original diagnosis expression $D_k$, the joint diagnostic expression $D_{new}$ is discarded.

Otherwise, the processing unit 110 is adapted to add the joint diagnostic expression $D_{new}$ to an updated disjunction of diagnostic expressions Q in a second storage area 130. Thereafter, the processing unit 110 is adapted to also add any remaining diagnostic expressions in the temporary disjunction of diagnostic expressions $D_{old}$ to the updated disjunction of diagnostic expressions Q. Thus, the updated disjunction of diagnostic expressions Q represents an estimated status of the entity 150, whose merits constitutes yet an improvement relative to the previous version of Q. Naturally, the updated disjunction of diagnostic expressions Q may serve as a basis for an updated status report R[Q] produced by the processing unit 110.

Preferably, the diagnosis engine 100 includes, or is associated with, a computer readable medium 160 (e.g. a memory module) having a program recorded thereon, where the program is adapted to make the processing unit 110 control the steps of above-described procedure.

Figure 2:
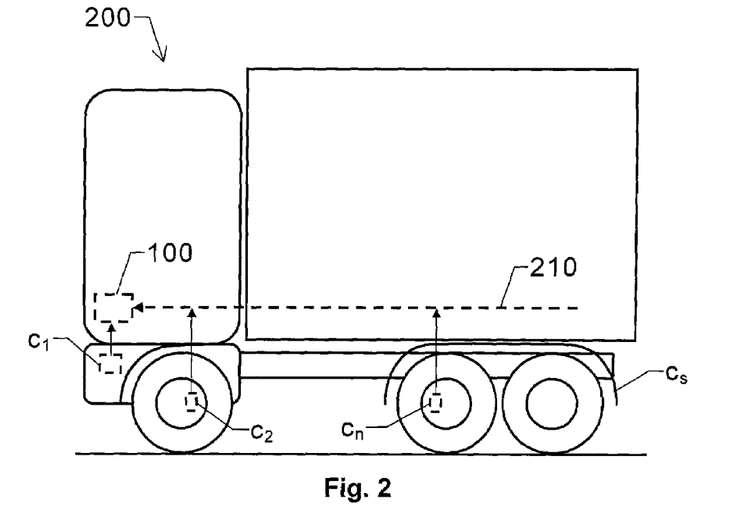

FIG. 2 schematically depicts a motor vehicle 200 being equipped with the proposed diagnosis engine 100. Specifically, the vehicle 200 includes a number of components $c_1$, $c_2, \ldots, c_n, \ldots c_s$ and a diagnosis system, which is adapted to estimate a status of at least a sub-group of its components, say $c_1, \ldots, c_n$. The diagnosis engine 100, in turn, is included in the diagnosis system. Preferably, the diagnosis engine 100 is implemented in an ECU (electronic control unit) and test results in respect of one or more of the components in said sub-group $c_1, \ldots, c_n$ may be delivered to the diagnosis engine 100 via a data bus 210, e.g. adapted to the CAN format (CAN=Controller Area Network). However, the data bus 210 may equally well be adapted to any other standard, such as Time Triggered CAN (TTCAN), FlexRay, Media Oriented System Transport (MOST) or ByteFlight. These standards all represent efficient means of accomplishing networks in trucks, busses and other motor vehicles. By interconnecting various control units of a vehicle via a network, a very large number of vehicle functions may be accomplished based on relatively few ECUs. Namely, by combining resources from two or more ECUs a flexible and cost efficient over-all vehicular design is obtained.

The test results may equally well be generated in an ECU being common to an ECU in which the proposed diagnosis engine is implemented. Naturally, in such a case, the test results do not need to be sent via an external data bus.

Figure 3:
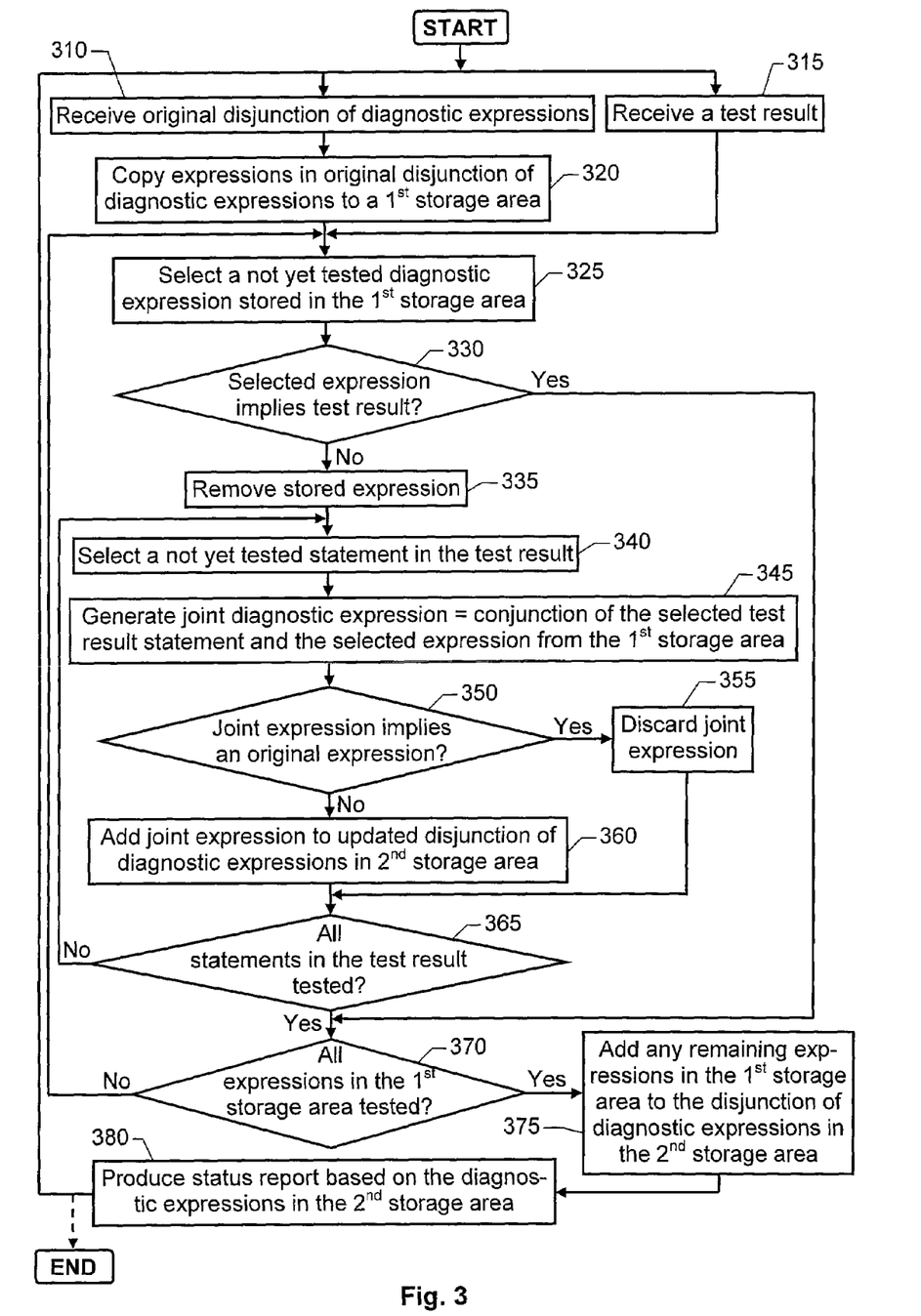
FIG. 3 shows a flow diagram illustrating the general method according to the invention.

In order to sum up, the general method of diagnosing an entity including a plurality of components according to the invention will be described below with reference to the flow diagram in FIG. 3.

A first step 310 receives an original disjunction of diagnostic expressions, which for at least one of said components indicate a respective mode that reflects whether the component is fault-free, or has exactly one of at least one fault. A step 315, which may be parallel to, subsequent to or preceding the step 310, receives a test result in respect of the entity. The test result is a disjunction of statements, wherein each statement indicates at least one of said fault-free or fault modes for one of the entity's components.

A step 320 being subsequent to the step 310 copies the expressions in the original disjunction of diagnostic expressions to a temporary disjunction of diagnostic expressions in a first storage area.

Then, a step 325 selects a not yet tested diagnostic expression in a first storage area, where after a step 330 investigates whether or not a currently investigated diagnostic expression implies the test result. If this is found not to be the case, a step 335 follows. Otherwise, the procedure continues to a step 370.

The step 335 removes the stored diagnostic expression from the first storage area. Thereafter, a step 340 selects a not yet tested statement in the test result. Subsequently, a step 345 generates a joint diagnostic expression representing a conjunction of the selected test result statement and the currently investigated diagnostic expression from the first storage area. Then, a step 350 compares the joint diagnostic expression with each diagnostic expression in the original disjunction of diagnostic expressions except for the currently investigated diagnostic expression. If an original diagnostic expression is found, where the joint diagnostic expression implies the original diagnosis expression, a step 355 follows. Otherwise, the procedure continues to a step 360, which adds the joint diagnostic expression to an updated disjunction of diagnostic expressions in a second storage area. The updated disjunction of diagnostic expressions represents an estimated status of the entity. After the step 350, the procedure continues to a step 365.

The step 355 discards the joint diagnostic expression from the first storage area, and then the step 365 follows. This step checks whether all statements in the test result have been tested, and if so, a step 370 follows. Otherwise, the procedure loops back to the step 340. The step 370 checks whether all diagnostic expressions in the first storage area have been tested, and if so, a step 375 follows. Otherwise, the procedure loops back to the step 325.

The step 375 adds any remaining diagnostic expressions in the temporary disjunction of diagnostic expressions to the updated disjunction of diagnostic expressions in the second storage area. Thereafter, a step 380 produces a status report based on said updated disjunction of diagnostic expressions. Finally, the procedure may either end, or it may loop back to the step 310 and/or 315 for reception of further diagnostic expressions or test results respectively.

After the step 380, the procedure may either end, or loop back to the steps 310/315 for reception of any new diagnostic expressions or test results respectively.

All of the process steps, as well as any sub-sequence of steps, described with reference to the FIG. 3 above may be controlled by means of a programmed computer apparatus. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code; object code, a code intermediate source and object code such as in partially compiled form, or in any other form suitable for use in the implementation of the process according to the invention. The carrier may be any entity or device capable of carrying the program. For example, the carrier may comprise a storage medium, such as a Flash memory, a ROM (Read Only Memory), for example a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal, which may be conveyed via electrical or optical cable or by radio or by other means. When the program is embodied in a signal, which may be conveyed, directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The invention is not restricted to the described embodiments in the figures, but may be varied freely within the scope of the claims.

The invention claimed is:

1. A diagnosis engine for estimating a status of an entity with a plurality of components which each is assumed to be in a fault-free mode or be in exactly one of at least one fault mode, the diagnosis engine comprising:
   a processing unit adapted to analyze test results; and
   at least one storage area adapted to store diagnostic data in respect of the entity,
   wherein said processing unit is adapted to:
   receive an original disjunction of diagnostic expressions indicating at least one of said modes for at least one of said components,
   receive first test results of a set of diagnostic tests in respect of the entity, the result of each test being a disjunction of statements wherein each statement indicates at least one of said modes for one of said components,
   store the expressions in the original disjunction of diagnostic expressions to a temporary disjunction of diagnostic expressions in a first storage area,
   investigate, for each diagnostic expression in the temporary disjunction of diagnostic expressions, whether a currently investigated diagnostic expression implies the first test result; if not so, remove the expression from the temporary disjunction of diagnostic expressions; and, for each statement in the first test result,
      generate a joint diagnostic expression representing a conjunction of the statement and the currently investigated diagnostic expression,
      compare the joint diagnostic expression with each diagnostic expression in the original disjunction of diagnostic expressions except for the currently investigated diagnostic expression, and,
         discard the joint diagnostic expression, if an original diagnostic expression is found, where the joint diagnostic expression implies the original diagnosis expression, or,
         add the joint diagnostic expression to an updated disjunction of diagnostic expressions in a second storage area, if an original diagnostic expression is not found, the updated disjunction of diagnostic expressions representing an estimated status of the entity, thereafter
   add all remaining diagnostic expressions in the temporary disjunction of diagnostic expressions to the updated disjunction of diagnostic expressions, and
   produce a status report based on the updated disjunction of diagnostic expressions.

2. The diagnosis engine according to claim 1, wherein after having processed a result of the first test of the set of diagnostic tests, the processing unit is adapted to, for each result of at least one second test of the tests:

investigate, for each diagnostic expression in the temporary disjunction of diagnostic expressions, whether or not a currently investigated diagnostic expression implies the result of the second test; if not so, remove the expression from the temporary disjunction of diagnostic expressions; and, for each statement in the result of the second test, generate a joint diagnostic expression representing a conjunction of the statement and the currently investigated diagnostic expression, compare the joint diagnostic expression with each diagnostic expression in the original disjunction of diagnostic expressions except for the currently investigated diagnostic expression, and, discard the joint diagnostic expression, if an original diagnostic expression is found, where the joint diagnostic expression implies the original diagnosis expression, or, add the joint diagnostic expression to the updated disjunction of diagnostic expressions in the second storage area, if an original diagnostic expression is not found, thereafter add all remaining diagnostic expressions in the temporary disjunction of diagnostic expressions to the updated disjunction of diagnostic expressions, and produce an updated status report based on the updated disjunction of diagnostic expressions.

3. A motor vehicle comprising a plurality of components and a diagnosis system adapted to estimate a status of at least a sub-group of said components, wherein the diagnosis system comprises a diagnosis engine comprising:

a processing unit adapted to analyze test results; and at least one storage area adapted to store diagnostic data in respect of the motor vehicle, wherein said processing unit is adapted to:

receive an original disjunction of diagnostic expressions indicating at least one mode for at least one of said components, wherein the at least one mode is a fault-free mode or one of at least one fault mode, receive first test results of a set of diagnostic tests in respect of the motor vehicle, the result of each test being a disjunction of statements, wherein each statement indicates at least one of said modes for one of said components, store the expressions in the original disjunction of diagnostic expressions to a temporary disjunction of diagnostic expressions in a first storage area, investigate, for each diagnostic expression in the temporary disjunction of diagnostic expressions, whether a currently investigated diagnostic expression implies the first test result, if not so, remove the expression from the temporary disjunction of diagnostic expressions, and, for each statement in the first test result, generate a joint diagnostic expression representing a conjunction of the statement and the currently investigated diagnostic expression, compare the joint diagnostic expression with each diagnostic expression in the original disjunction of diagnostic expressions except for the currently investigated diagnostic expression, and, discard the joint diagnostic expression if an original diagnostic expression is found, where the joint diagnostic expression implies the original diagnosis expression, or, add the joint diagnostic expression to an updated disjunction of diagnostic expressions in a second storage area, if an original diagnostic expression is not found, the updated disjunction of diagnostic expressions representing an estimated status of the entity, thereafter add all remaining diagnostic expressions in the temporary disjunction of diagnostic expressions to the updated disjunction of diagnostic expressions, and produce a status report based on the updated disjunction of diagnostic expressions.

4. A method of diagnosing an entity with a plurality of components which each is assumed to be in a fault-free mode or be in exactly one of at least one fault mode, said method comprising:

receiving an original disjunction of diagnostic expressions indicating at least one of said modes for at least one of said components, receiving a first test result of a set of diagnostic tests in respect of the entity, the result of each test being a disjunction of statements wherein each statement indicates at least one of said modes for one of said components, storing the expressions in the original disjunction of diagnostic expressions to a temporary disjunction of diagnostic expressions in a first storage area, investigating, for each diagnostic expression in the temporary disjunction of diagnostic expressions, whether a currently investigated diagnostic expression implies the first test result; if not so, remove the expression from the temporary disjunction of diagnostic expressions; and, for each statement in the first test result, generating a joint diagnostic expression representing a conjunction of the statement and the currently investigated diagnostic expression, comparing the joint diagnostic expression with each diagnostic expression in the original disjunction of diagnostic expressions except for the currently investigated diagnostic expression, and, discarding the joint diagnostic expression if an original diagnostic expression is found, where the joint diagnostic expression implies the original diagnosis expression, or, adding the joint diagnostic expression to an updated disjunction of diagnostic expressions in a second storage area, if an original diagnostic expression is not found, the updated disjunction of diagnostic expressions representing an estimated status of the entity, thereafter adding all remaining diagnostic expressions in the temporary disjunction of diagnostic expressions to the updated disjunction of diagnostic expressions, and producing a status report based on the updated disjunction of diagnostic expressions.

5. The method according to claim 4, wherein receiving an original disjunction of diagnostic expressions further comprises receiving an original disjunction of diagnostic expressions that is empty prior to receiving the first test result of the set of diagnostic tests of the entity.

6. The method according to claim 4, wherein after having processed a result of the first test in the test result, the method comprises, for each result of at least one second test in the test result:

investigating, for each diagnostic expression in the temporary disjunction of diagnostic expressions, whether a currently investigated diagnostic expression implies the result of the second test; if not so, remove the expression from the temporary disjunction of diagnostic expressions; and, for each statement in the result of the second test,
generating a joint diagnostic expression representing a conjunction of the statement and the currently investigated diagnostic expression,
comparing the joint diagnostic expression with each diagnostic expression in the original disjunction of diagnostic expressions except for the currently investigated diagnostic expression, and,
discarding the joint diagnostic expression, if an original diagnostic expression is found, where the joint diagnostic expression implies the original diagnosis expression, or,
adding the joint diagnostic expression to the updated disjunction of diagnostic expressions in a second storage area, if an original diagnostic expression is not found, thereafter
adding all remaining diagnostic expressions in the temporary disjunction of diagnostic expressions to the disjunction of diagnostic expressions, and
producing an updated status report based on the updated disjunction of diagnostic expressions.

7. A computer program product, comprising:
a computer-readable medium comprising:
   a first set of codes for causing a computer to receive an original disjunction of diagnostic expressions indicating at least one mode for at least one of a plurality of components including in an entity, wherein the at least one mode is a fault-free mode or one of at least one fault modes;
   a second set of codes for causing the computer to receive first test results of a set of diagnostic tests in respect of the entity, the result of each test being a disjunction of statements, wherein each statement indicates at least one of the modes for one of said components;
   a third set of codes for causing the computer to store the expressions in the original disjunction of diagnostic expressions to a temporary disjunction of diagnostic expressions in a first storage area;
   a fourth set of codes for causing the computer to investigate, for each diagnostic expression in the temporary disjunction of diagnostic expressions, whether a currently investigated diagnostic expression implies the first test result;
   a fifth set of codes for causing the computer, if the currently investigated diagnostic expression does not imply the first test result, to remove the expression from the temporary disjunction of diagnostic expressions and, for each statement in the test result;
      a sixth set of codes for causing the computer to generate a joint diagnostic expression representing a conjunction of the statement and the currently investigated diagnostic expression;
      a seventh set of codes for causing the computer to compare the joint diagnostic expression with each diagnostic expression in the original disjunction of diagnostic expressions except for the currently investigated diagnostic expression;
      a eighth set of codes for causing the computer, to discard the joint diagnostic expression, if an original diagnostic expression is found, where the joint diagnostic expression implies the original diagnosis expression, or add the joint diagnostic expression to an updated disjunction of diagnostic expressions in a second storage area, if an original diagnostic is not found, the updated disjunction of diagnostic expressions representing an estimated status of the entity;
   a ninth set of codes for causing the computer to add all remaining diagnostic expressions in the temporary disjunction of diagnostic expressions to the updated disjunction of diagnostic expressions; and
   a tenth set of codes for causing the computer to produce a status report based on the updated disjunction of diagnostic expressions.

8. The computer program product of claim 7, wherein the first set of codes of the computer-readable medium further comprises first set of codes for causing the computer to receive an original disjunction of diagnostic expressions that is empty prior to receiving the first test result of the set of diagnostic tests of the entity.

9. The computer program product of claim 7, wherein after having processed a result of the first test in the test result, for each result of at least one second test in the test result, wherein,
   the fourth set of codes further causes the computer to investigate, for each diagnostic expression in the temporary disjunction of diagnostic expressions, whether a currently investigated diagnostic expression implies the second test result;
   the fifth set of codes further causes the computer, if the currently investigated diagnostic expression does not imply the second test result, to remove the expression from the temporary disjunction of diagnostic expressions and, for each statement in the second test result;
   the sixth set of codes further causes the computer to generate a joint diagnostic expression representing a conjunction of the statement and the currently investigated diagnostic expression;
   the seventh set of codes further causes the computer to compare the joint diagnostic expression with each diagnostic expression in the original disjunction of diagnostic expressions except for the currently investigated diagnostic expression;
   the eighth set of codes further causes the computer to discard the joint diagnostic expression, if an original diagnostic expression is found, where the joint diagnostic expression implies the original diagnosis expression, or add the joint diagnostic expression to an updated disjunction of diagnostic expressions in a second storage area, if an original diagnostic is not found, the updated disjunction of diagnostic expressions representing an estimated status of the entity;
   the ninth set of codes further causes the computer to add all remaining diagnostic expressions in the temporary disjunction of diagnostic expressions to the updated disjunction of diagnostic expressions; and
   the tenth set of codes further causes the computer to produce an updated status report based on the updated disjunction of diagnostic expressions.

* * * * *